(12) United States Patent
Fryer

(10) Patent No.: US 11,811,739 B2
(45) Date of Patent: Nov. 7, 2023

(54) WEB ENCRYPTION FOR WEB MESSAGES AND APPLICATION PROGRAMMING INTERFACES

(71) Applicant: T-MOBILE USA, INC., Bellevue, WA (US)

(72) Inventor: Julianne Fryer, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 247 days.

(21) Appl. No.: 17/142,498

(22) Filed: Jan. 6, 2021

(65) Prior Publication Data
US 2022/0217124 A1 Jul. 7, 2022

(51) Int. Cl.
*H04L 9/40* (2022.01)
*H04L 9/32* (2006.01)

(52) U.S. Cl.
CPC ........ *H04L 63/0428* (2013.01); *H04L 9/3213* (2013.01); *H04L 63/0815* (2013.01); *H04L 63/10* (2013.01)

(58) Field of Classification Search
CPC ............... H04L 63/0428; H04L 9/3213; H04L 63/0815; H04L 63/10; H04L 63/0807; H04L 63/04
See application file for complete search history.

(56) References Cited

U.S. PATENT DOCUMENTS

| | | | | |
|---|---|---|---|---|
| 11,146,406 | B2* | 10/2021 | Schiffman | H04L 63/0823 |
| 2010/0293385 | A1* | 11/2010 | Nanda | H04L 63/08 |
| | | | | 713/181 |
| 2010/0299738 | A1* | 11/2010 | Wahl | G06F 21/33 |
| | | | | 713/170 |
| 2012/0167185 | A1* | 6/2012 | Menezes | H04L 67/563 |
| | | | | 726/5 |
| 2016/0360403 | A1* | 12/2016 | Jordi | H04W 12/06 |
| 2018/0294965 | A1* | 10/2018 | Yan | H04L 9/006 |
| 2019/0124070 | A1* | 4/2019 | Engan | H04L 9/3234 |
| 2019/0312730 | A1* | 10/2019 | Engan | H04L 63/126 |
| 2020/0286607 | A1* | 9/2020 | Abuzeni | G16H 20/10 |
| 2021/0226794 | A1* | 7/2021 | Axdorff | H04W 12/084 |
| 2021/0243177 | A1* | 8/2021 | Burson | H04W 12/06 |

OTHER PUBLICATIONS

Jones, Michael, John Bradley, and Hannes Tschofenig. Proof-of-possession key semantics for JSON Web Tokens (JWTs). No. rfc7800. 2016. (Year: 2016).*

* cited by examiner

*Primary Examiner* — Michael R Vaughan
(74) *Attorney, Agent, or Firm* — Lee & Hayes, P.C.

(57) ABSTRACT

Systems and methods for providing access to online content while also securing user confidential information are presented. User confidential information (e.g., user phone number or e-mail address) may be used to authenticate and authorize a client device to access online resources, such as microservices exposed via application programming interfaces (APIs). With the techniques described herein, such user confidential information is protected both in transit over a network connection and while at rest in storage on the client device. This is achieved through the use of an encrypted access token (e.g., a JSON Web Encryption (JWE) token) including the user confidential information in an encrypted form. The client device receives such encrypted access token from an identity provider (IDP) and passes it to a resource server API to access the microservices associated with the API, without the client device decrypting the user confidential information contained therein.

17 Claims, 4 Drawing Sheets

WEB ENCRYPTION FOR WEB MESSAGES AND APPLICATION PROGRAMMING INTERFACES

FIELD OF THE DISCLOSURE

The present disclosure relates to securing confidential information used in authorizing user access to web-based services through application programming interfaces (APIs) using a token-based approach.

BACKGROUND

Existing techniques for providing access to online resources typically involve authenticating and authorizing user access based upon user credentials. Online resources include services or microservices that permit a user to interact with a secure server to submit information to the server, retrieve information from the server, edit information stored on the server, or perform data processes based upon user-submitted information. Such resources are typically exposed to external users via APIs. Depending upon the scope of the services, such APIs may be secured to protect against unauthorized access or damage to the data resources caused by accidental or malicious misuse of the APIs. Thus, user credentials are used (either directly or indirectly) to protect the data resources exposed to client devices associated with users. In some situations, the user credentials may be stored in cookies or tokens stored on a client device to allow the user access to the resources for a period of time without needing to obtain the user credentials from the user each time the resources are accessed. Such user credentials typically include a unique user identifier (user ID). For simplicity and interconnection, many systems use confidential information (e.g., a phone number or e-mail address) as a user ID.

As data privacy concerns have grown in recent years, however, there has been an increasing need for techniques to provide access to online resources without exposing user confidential information. When user confidential information is used as a unique user ID, such confidential information is exposed to attacks while in transit over a communication network connection between the client device as part of a message. The confidential information is also exposed to attacks while at rest in storage on the client device. For example, software bugs or malicious applications may expose information stored on the client device to malicious actors. Since many legacy systems are configured with user IDs based upon confidential information, new techniques to protect such user confidential information are needed.

SUMMARY

The present invention solves the problem of securing confidential information used to access online resources. To solve this problem, the techniques disclosed herein use encrypted access tokens to maintain data confidentiality and integrity both while in transit and at rest on a client device. The disclosure herein generally relates to systems, methods, and non-transitory computer-readable media storing instructions for securing confidential data used in accessing online resources. The systems, methods, and instructions disclosed herein may be implemented by client devices, identity provider servers, resource services, or combinations thereof.

The techniques described herein may include a method for securing confidential data used in accessing online resources, comprising: authenticating a user account for use by a client application of a client device based upon user credentials associated with the user account by communication between the client device and an identity provider (IDP) via a communication network; sending a token request message including an indication of authentication of the user account from the client application to the IDP; receiving at the client application an encrypted access token having a payload including a user identifier that is encrypted as part of the encrypted access token from the IDP; sending a resource request including the encrypted access token from the client application to a resource server via the communication network; and receiving at the client application a resource request response based upon the encrypted access token from the resource server.

The user identifier included in the encrypted access token may comprise a phone number associated with the user account. The client device may lack a key to decrypt the payload of the encrypted access token. The encrypted access token may be a JavaScript Object Notation (JSON) Web Encryption (JWE) token generated by the IDP or another type of encrypted token. Additionally or alternatively, the encrypted access token may be bound to a user session of the user account in the client application. In some embodiments, the encrypted access token may be stored in a memory of the client device, such that sending the encrypted access token to the resource server includes accessing the encrypted access token from the memory. In further embodiments, the method may include generating a proof-of-possession (PoP) token including an indication of a resource associated with the resource server, which PoP token is signed by a private key of the client application, in which case sending the resource request includes sending the PoP token to the resource server.

Systems or computer-readable media storing instructions for implementing all or part of the methods described above may also be provided in some aspects. Such systems or computer-readable media may include executable instructions to cause one or more processors to implement part or all of the methods described above. Additional or alternative features described herein below may be included in some aspects.

BRIEF DESCRIPTION OF THE DRAWINGS

The figures described below depict various aspects of the systems and methods disclosed herein. Advantages will become more apparent to those skilled in the art from the following description of the embodiments which have been shown and described by way of illustration. As will be realized, the present embodiments may be capable of other and different embodiments, and their details are capable of modification in various respects. Accordingly, the drawings and description are to be regarded as illustrative in nature and not as restrictive. Further, wherever possible, the following description refers to the reference numerals included in the following figures, in which features depicted in multiple figures are designated with consistent reference numerals.

DETAILED DESCRIPTION

The systems, methods, and techniques described herein solve the problem of securing user confidential information used to access online resources. To solve this problem, the techniques disclosed herein use encrypted access tokens to maintain data confidentiality and integrity both while in transit over a communication network connection and at rest in storage on a client device. Unlike existing techniques, the user confidential information is not exposed during storage on the client device, even in situations where the client device has been compromised. Additionally, the techniques disclosed herein may be used by first-party client applications associated with the identity provider (IDP), as well as third-party client applications. Additional, fewer, or alternative aspects may be included in various embodiments, as described herein.

Figure 1:
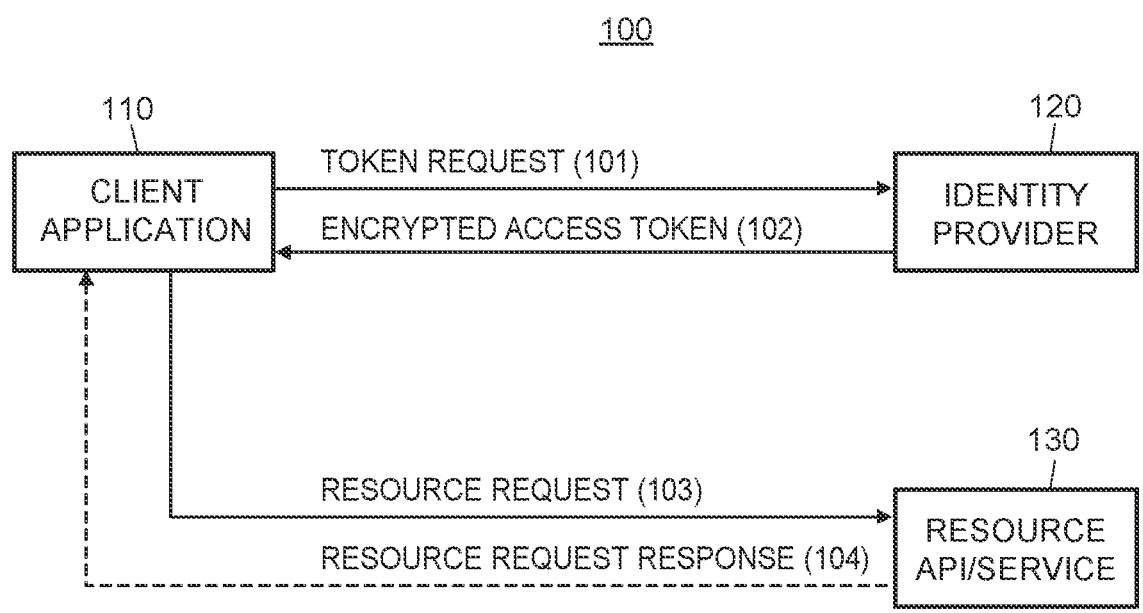
FIG. 1 illustrates a block diagram of an exemplary secure resource access technique for provisioning and using encrypted access tokens to access secure online resources.

FIG. 1 illustrates a block diagram of an exemplary secure resource access technique 100 for provisioning and using encrypted access tokens to access secure online resources. The secure resource access technique 100 may be implemented to provide access to remote resources through application programming interfaces (APIs) or services in a secure manner, while maintaining the security and confidentiality of user account information needed to access some such resources. As illustrated, a client application 110 obtains an encrypted access token from an identity provider (IDP) 120, which encrypted access token protects the payload by remaining encrypted even when stored or used by the client application 110. Thus, any user confidential data included in the encrypted access token (e.g., user phone number or e-mail address) remains secure against attacks, even if the device running the client application 110 is compromised.

To obtain the encrypted access token, the client application 110 sends a token request 101 to the IDP 120. The token request 101 includes an indication of authentication or authorization, such as a code previously received from the IDP 120 based upon account credentials provided to the IDP 120. The token request 101 may also include information to enable the IDP 120 to generate an encrypted access token that is bound to the client application 110 (or to an application session or user session associated with the client application 110). In response to a valid token request 101, the IDP 120 generates and returns an encrypted access token 102 to the client application 110, which includes an encrypted payload that may safely contain user confidential information. The encrypted access token may be a JavaScript Object Notation (JSON) Web Encryption (JWE) token or other type of encrypted token, as discussed elsewhere herein. Upon receiving the encrypted access token 102 from the IDP 120, the client application 110 may use the encrypted access token to obtain access to secure resources of a resource server via a resource API or service 130. A copy of the encrypted access token 102 received from the IDP 120 may also be stored by the client application 110 for further use in accessing secure resources.

To access a secure resource, the client application 110 sends a resource request 103 that includes a copy of the encrypted access token to a resource API or service 130 associated with the resource. The resource request 103 may further include parameters corresponding to the resource request, such as information identifying the client application 110 or the resource. Upon receiving the resource request 103, the resource API or service 130 verifies the resource request 103 is authorized based upon the encrypted access token included in the resource request 103. To validate the encrypted access token received in the resource request 103, the resource API or service 130 may decrypt the encrypted access token using a public or private key, which may be available to the resource API or service 130 as part of the same system as the IDP 120. Thus, the IDP 120 and the resource APIs or services 130 may be operated by the same entity and may share data (e.g., cryptographic keys) in a secure manner using internal networks without exposing such data to external networks. After validation, the resource API or sever 130 may provide a resource request response 104 to the client application 110, such as by providing requested data (e.g., account data or media content) or by providing a confirmation that one or more actions associated with the resource request have been performed (e.g., confirmation that account data has been updated). Thus, the client application 110 uses the encrypted access token obtained from the IDP 120 to obtain access to the secure resources via a resource API or service 130 without exposing user confidential data to malicious or accidental disclosure.

Figure 2:
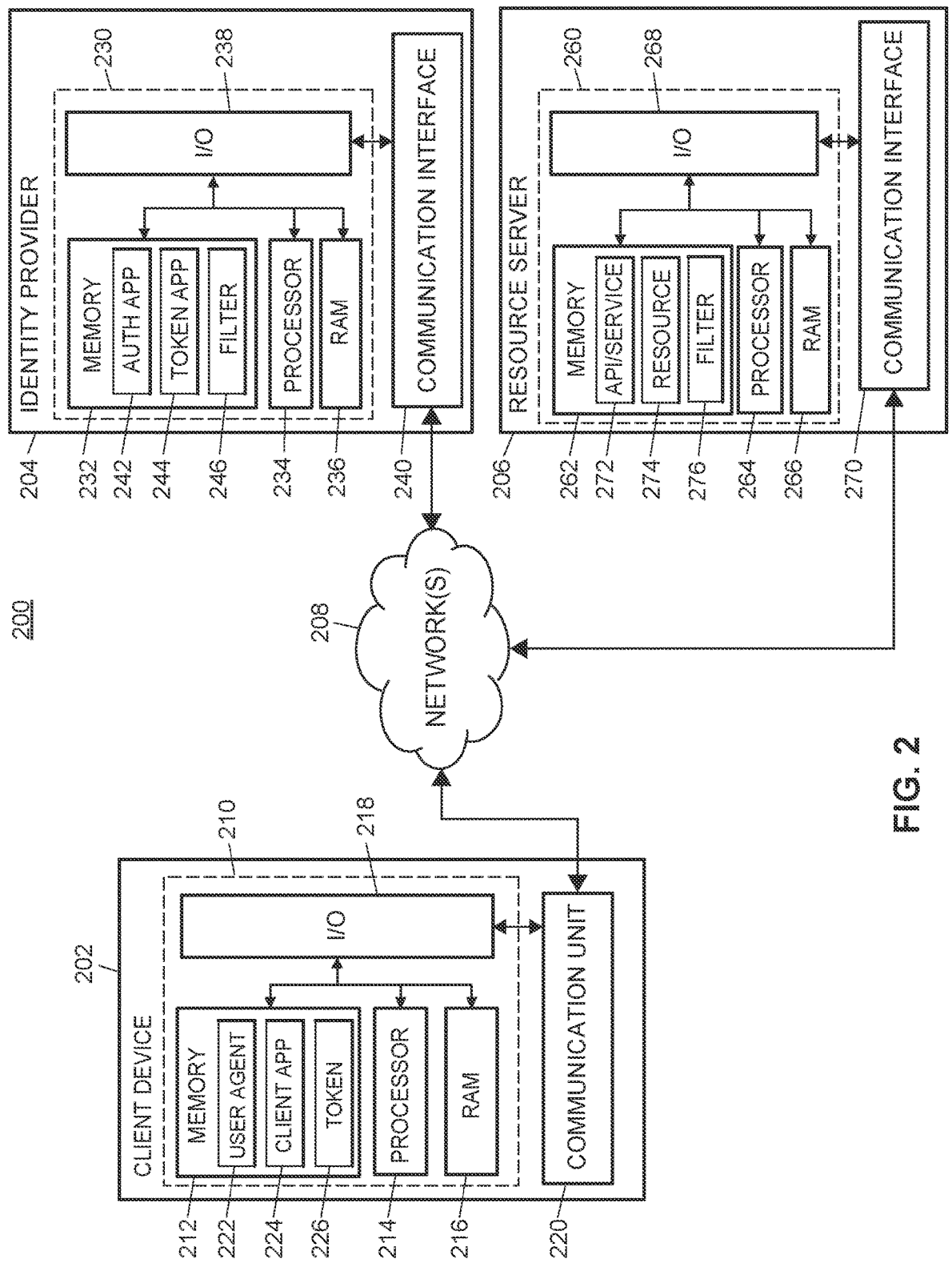
FIG. 2 illustrates a block diagram of an exemplary resource security system, comprising a client device, an identity provider, and a resource server.

FIG. 2 illustrates a block diagram of an exemplary resource security system 200, comprising a client device 202, an identity provider 204, and a resource server 206. These components of the resource security system 200 are communicatively connected via a network 208. The resource security system 200 provides an example of an environment in which the techniques described herein may be implemented to provide secure access to online resources using encrypted access tokens. Although only one of each of the client device 202, identity provider (IDP) 204, resource server 206, and network 208 (along with each of their constituent components) is illustrated for simplicity, alternative embodiments may include multiple such components. Additional, fewer, or alternative components or configurations may be implemented in various embodiments.

The client device 202 is a computing device associated with a user to interact with the IDP 204 and the resource server 206 via the network 208, such as a smartphone, a workstation computer, a tablet computer, a smart device (e.g., a smart speaker, a personal digital assistant device, or an Internet-of-Things (IoT) connected device or component), or other type of computing device capable of receiving and processing electronic information through an electronic communication network. Thus, the client device 202 includes a controller 210 to receive, store, process, generate, and output data. The controller 210 includes a memory 212 storing processor-executable instructions in a non-transitory medium, one or more processors 214 configured to execute computer-readable instructions, a random access memory (RAM) 216 for temporary memory, and an input/output (I/O) circuit 218. The components of the controller 210 may be interconnected via an address/data bus or other means. It should be appreciated that although only one processor 214 is depicted, the controller 210 may include multiple processors 214 in some embodiments. Similarly, the controller 210 may include multiple RAMs 216 and multiple memories 212. Although the I/O circuit 218 is likewise depicted as a single block, the I/O circuit 218 may include a number of different I/O circuits, which may be configured for specific I/O operations. The processor 214 may include one or more processors of any known or hereafter developed type, including general-purpose processors or special-purpose processors. Similarly, the controller 210 may implement the RAM 216 and memory 212 as semiconductor memories, magnetically readable memories, optically readable memories, or any other type of memory.

To implement functionality of the resource security system 200, the memory 212 of the client device 2020 may store various applications, routines, software modules, and data. Thus, memory 212 includes a client application 224 (e.g., a web browser or special-purpose application) enabling the user to interact with the resources of the resource server 206, such as to request media content or to access and update user account data. A user agent 222 is also provided in the memory 212 to handle authentication and authorization of a user account via communication with the IDP 204, such as by receiving and sending user account credentials (e.g., user name and password) to the IDP 204. Depending upon resource and development considerations, the user agent 222 may be a separate software module or may be part of the client application 224. Upon receiving an encrypted access token 226 from the IDP 204, the client device 202 also stores the token 226 in the memory 212 for use in accessing resources of the resource server 206.

To provide network connectivity over the network 208, the client device 202 further includes a communication unit 220 capable of sending and receiving data via wired or wireless communication links to the network 208. The communication unit 220 may include hardware and software components (e.g., encoding modules, decoding modules, and antennas) to transmit messages based up data received from the controller 210 or to provide received messages to the controller 210. The communication unit 220 may transmit and receive wired or wireless communications with external devices via the network 208, using any suitable wireless communication protocol network, such as a wireless telephony network (e.g., GSM, CDMA, LTE, 5G, etc.), a Wi-Fi network (802.11 standards), a WiMAX network, etc. Furthermore, the communication unit 220 may provide input signals to the controller 210 via the I/O circuit 218. The controller 210 of the client device 202 may further be configured to communicate data through the communication unit 220 using any suitable data protocol.

The IDP 204 comprises computing components configured to authenticate and authorize the client device 202 to access external resources based upon an association of the client device 202 with a user account. Thus, the IDP 204 comprises a computing device (e.g., one or more servers) configured to communicate via the network 208, as well as to receive, store, process, generate, access, and output data Like the client device 202, the IDP 204 includes a controller 230 that stores and processes electronic data and a communication interface 240 that communicates with external computing devices (e.g., client devices 202 or resource servers 206) via the network 208. Similar to the controller 210, the controller 230 receives, processes, produces, transmits, and stores data. The controller 230 includes a memory 232, a processor 234, a RAM 236, and an I/O circuit 238, each configured and operating analogously to the corresponding components of the controller 210 described above. The IDP 204 also includes a communication interface 240 configured to send and receive communications between the IDP 204 and external computing devices via a data network connection with the network 208. Similar to the communication unit 220, the communication interface 240 may include software and hardware components configured to enable communication using standard or specialized communication protocols, via wired or wireless communication connections.

To implement functionality of the resource security system 200, the memory 232 of the IDP 204 may store various applications, routines, software modules, and data. Thus, memory 232 includes an authentication application 242 and the token application 244. The authentication application 242 may obtain user account credentials from the client device 202 and authenticate the user account on the client device 202. Upon authentication, the token application 244 may generate an encrypted access token associated with the user account and send the encrypted access token to the client device 202. Additionally, in some embodiments, the memory 232 of the IDP 204 may store further instructions for one or more encryption or decryption filters 246. Such filters 246 may be used to encrypt or decrypt payload content to generate or use the encrypted access token to provide access to secured external resources based upon user account credentials or related information. In some such embodiments, an encryption filter 246 may encrypt the payload using a public key associated with a particular resource.

The resource server 206 comprises computing components configured to provide access to secured external resources to the client device 202, based upon verification of user account authorization. Thus, the resource server 206 comprises one or more servers configured to communicate via the network 208, as well as to receive, store, process, generate, access, and output data. Like the client device 202, the resource server includes a controller 260 that stores and processes electronic data and a communication interface 270 that communicates with external computing devices (e.g., client devices 202 or IDP 204) via the network 208. Similar to the controller 210, the controller 260 receives, processes, produces, transmits, and stores data. The controller 260 includes a memory 262, a processor 264, a RAM 266, and an I/O circuit 268, each configured and operating analogously to the corresponding components of the controller 210 described above. The resource server 206 also includes a communication interface 270 configured to send and receive communications between the resource server 206 and external computing devices via a data network connection with the network 208. Similar to the communication unit 220, the communication interface 270 may include software and hardware components configured to enable communication using standard or specialized communication protocols, via wired or wireless communication connections.

The memory 262 of the resource server 206 may store various applications, routines, software modules, and data to control access to resources stored on or accessed through the resource server 206. Thus, the memory 262 may store one or more APIs or services 272 for exposing resource access to client devices 202 via the network 208. The APIs or services 272 may be configured to verify user account authorization based upon an encrypted access token provided by the client device 202 prior to providing access to the resources. In some embodiments, the resource server 206 may decrypt encrypted access tokens using one or more decryption filters 276 stored in the memory 262. Such decryption filters 276 may access a private key of the resource server 206 to decrypt the payload content of an encrypted access token to verify user account authorization to access resources stored on or controlled by the resource server 206. Each decryption filter 276 may correspond to one or more of the APIs or services 272. The memory 262 may also store one or more resources 274 accessible via the APIs or services 272, which resources may include data and/or application logic. For example, such resources 274 may include streaming media content, user account details, account creation application logic, or other types of data or functions. In some embodiments, the resource server 206 may access one or more resources stored in additional networked memories, databases, or data stores (not shown) via the network 208 or via additional communication connections (not shown).

Figure 3:
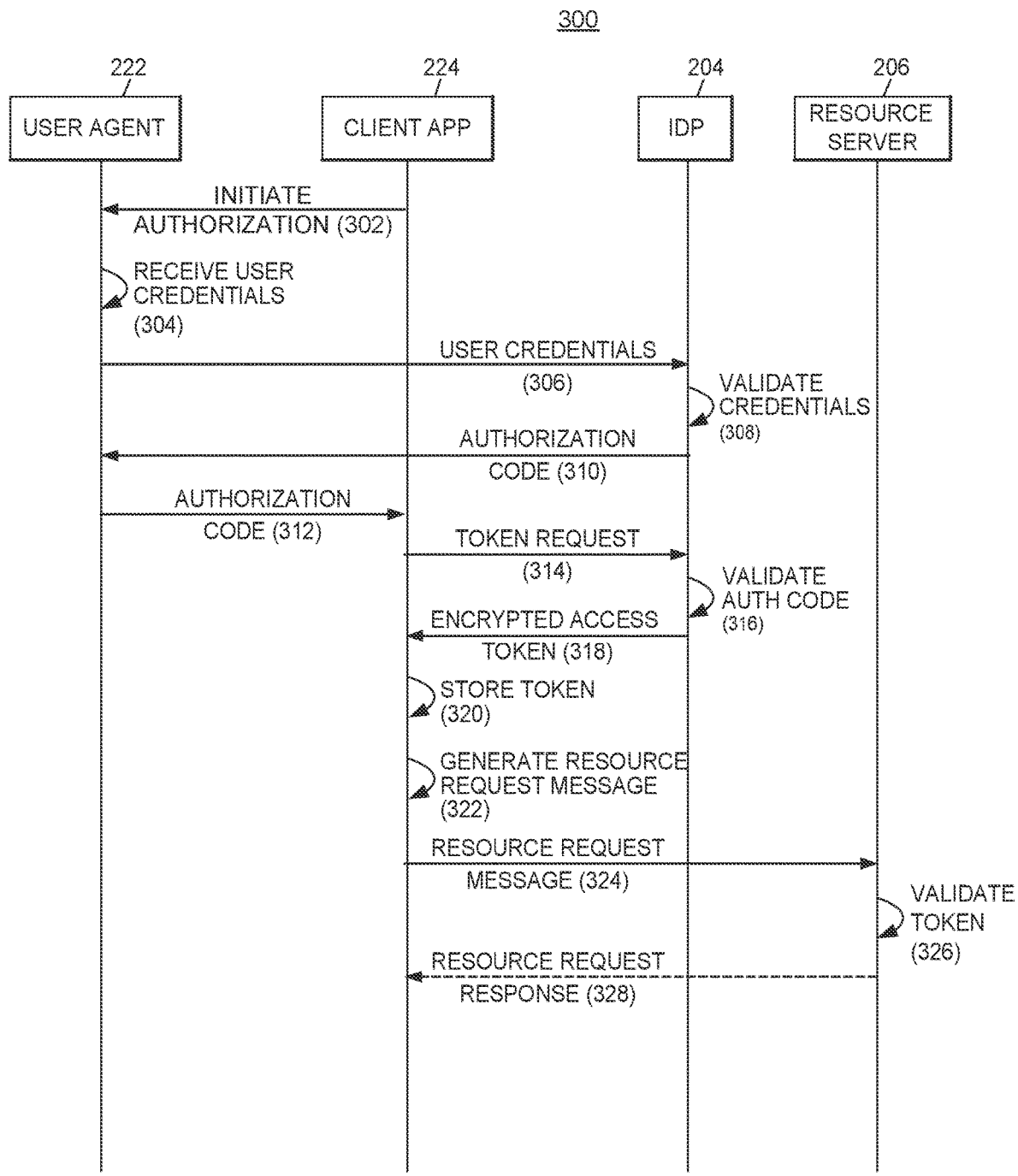
FIG. 3 illustrates a sequence diagram of an exemplary secure resource access process according to certain embodiments.

FIG. 3 illustrates a sequence diagram of an exemplary secure resource access process 300 according to certain embodiments. Parts of the exemplary resource access process 300 may be implemented by communicating messages via the network 208, while communication between the user agent 222 and the client application 224 may occur within the client device 202. Additional or alternative aspects may be included in some embodiments.

The secure resource access process 300 begins with an initiate authorization request 302 from the client application 224 to the user agent 222. Such initiate authorization request 302 may be sent in response to a user action to log in to a system or to access secured resources (e.g., resources 274 of the resource server 206). Upon receiving the initiate authorization request 302, the user agent 222 obtains user credentials by accessing stored user credentials or otherwise receiving the user credentials from the user (line 304). For example, the user agent 222 may present a login screen or window to enable receiving or accessing the user credentials from the user (e.g., by receiving a user name, password, personal identification number, security question response, or biometric identification data). Upon receiving the user credentials, the user agent 222 sends the user credentials to the IDP 204 in a user credential message 306, which may be transmitted in an encrypted message or over a secure connection (e.g., using transport layer security).

The IDP 204 validates the user credentials received from the user agent 222 (line 308), which may include verifying the integrity of the received message and extracting or decrypting the user credentials from the received message. If the user credentials cannot be validated due to error or invalid credentials, the process may terminate. When the user credentials are validated, the IDS 204 generates and returns an authorization code by transmitting an authorization code message to the user agent 222. The authorization code message 310 may be transmitted in an encrypted message or over a secure connection. Upon receiving the authorization code message 310, the user agent 222 extracts the authorization code and provides an authorization code response 312 to the client application 224. The client application 224 is thus authenticated or authorized on the client device 202.

Upon receiving the authorization code response 312, the client application 224 proceeds to obtain an encrypted access token to enable access secure resources from one or more resource servers 206. To obtain such encrypted access token, the client application 224 sends a token request message 314 to the IDP 204, which may be transmitted in an encrypted message or over a secure connection. The token request message 314 includes the authorization code and may further include a client identifier to bind the encrypted access token to the client device 202 or to the client application 224. In some embodiments, a session identifier may also be included to bind the encrypted access token to a session. Upon receiving the token request message 314, the IDP 204 validates the authorization code and generates an encrypted access token. In some embodiments, the encrypted access token includes user confidential data, such as personally identifiable information used as a user identifier (e.g., user phone number or e-mail address). The encrypted access token may be generated as a JavaScript Object Notation (JSON) Web Encryption (JWE) token or other type of encrypted token, as discussed elsewhere herein. The IDP 204 then sends an encrypted access token message 318 containing the encrypted access token to the client application 224. Although the encrypted access token message 318 may be transmitted in an encrypted message or over a secure connection, transport security is not required because the encrypted access token is itself secure. Thus, interception or modification of the encrypted access token would not compromise the security of the system resources or any user confidential data included in the token. Upon receiving the encrypted access token message 318, the client application 224 may store the encrypted access token in the memory 212 of the client device 202 (i.e., as an encrypted access token 226). The encrypted access token may thus be stored for repeated use in accessing secure resources from one or more resource servers 206 over a duration of time, which time duration may be determined by an expiration parameter of the encrypted access token.

To access resources from a resource server 206, such as upon request by the user of the client device 202, the client application 224 generates a resource request message using the stored encrypted access token (line 322). The resource request message may include the encrypted access token. In some embodiments, generating the resource request message may include generating a proof-of-possession token to be included in the resource request message. However composed, the resource request message 324 is sent from the client application 224 to the resource server 206 to request access to secure resources (e.g., to access a resource 274 via an API or service 272 of the resource server 206). When the resource server 206 receives the resource request message 324 via an API or service 272, it validates the encrypted access token to verify user authorization to access the requested resource 274 (line 326). In some embodiments, such validation may include decrypting the payload of the encrypted access token via a decryption filter 276. Alternatively, the resource server 206 may communicate with the IPD 204 to provide the encrypted access token to the IDP 204 for decryption and verification by a decryption filter 246 of the IDP 204. After validation, the resource server 206 grants access to the requested resource 274 to the client application 224. In some embodiments, granting access to the resource may include sending a resource request response message 328 to the client application 224. Such resource request response message 328 may include data, files, or other content requested by the client application 224. Additionally or alternatively, granting access to the resource may include performing a function at the resource server 206 based upon the resource request message 324 (e.g., adding, deleting, updating, processing, or storing data in the memory 262 based upon the resource request message 324). After the resource server 206 performs an action in response to the resource request message 324 after validating the encrypted access token, the secure resource access process 300 may end.

Figure 4:
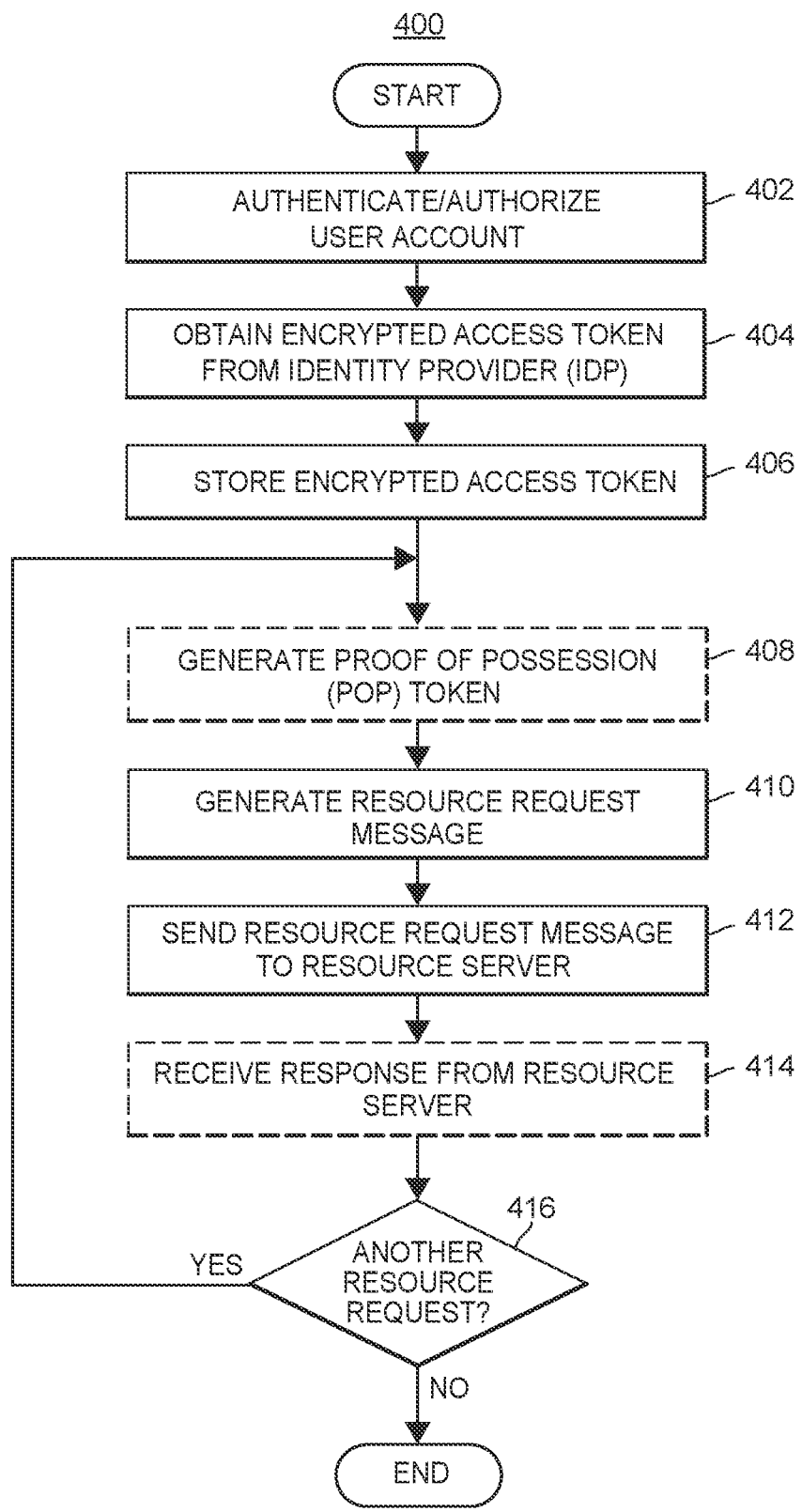
FIG. 4 illustrates a flow diagram of an exemplary secure resource access method according to certain embodiments.

FIG. 4 illustrates a flow diagram of an exemplary secure resource access method 400 for accessing secure resources using an encrypted access token. The secure resource access method 400 may be implemented by components of the client device 202 in communication via the network 208 with the IDP 204 and the resource server 206. Various aspects of the method may be performed by software applications, routines, or modules running on the client device 202, such as the user agent 222 and the client application 224.

The secure resource access method 400 begins with authentication or authorization of the user account at the client device 202 (block 402). The client device 202 then obtains an encrypted access token from the IDP 204 (block 404) and stores the received encrypted access token (block 406). To access the secure resources from the resource server 206, in some embodiments, the client device 202 generates a proof-of-possession (PoP) token (block 408). A resource request message is generated (block 410) and sent from the client device 202 to the resource server 206 (block 412). After the resource server 206 verifies user authorization, the resource request is processed by the resource server 206. In some embodiments, the client device 414 receives a response to the resource request message from the resource server 206 (block 414). The client device 416 may further generate and send additional resource request messages (and receive additional responses, as applicable) using the stored encrypted access token until no further resource requests remain (block 416). When no further resource requests remain, the method ends. Additional or alternative aspects may be included in some embodiments.

At block 402, the user agent 222 of the client device 202 authenticates or authorizes the user account for use by a client application 224 of the client device 202. Whether the user account is authorized for particular access or only authenticated will depend upon parameters and configuration of the resource security system 200, based upon the security requirements and the scope of use of the encrypted access token. When authorizing the user account for a particular level of access (e.g., access to a limited set of resources, such as access to view but not edit billing information), the IDP 204 may Authentication or authorization may include obtaining user credentials, sending the user credentials in a secure message to the IDP 204 for validation, and receiving an authorization code from the IDP 204 in a secure response. The user agent 222 may further provide the authorization code to the client application 224 of the client device 202 for use in obtaining the encrypted access token.

At block 404, the client application 224 obtains an encrypted access token from the IDP 204 via the network 208. To obtain the encrypted access token, the client application 224 sends a token request message including an indication of authentication of the user account (e.g., the authorization code received from the user agent 222) to the IDP 206. The token request message may also include an identifier of one or more of the client device 202, the client application 224, or a user session or application session within the client application 224. Thus, the IDP 204 may generate the encrypted access token such that the encrypted access token is bound to the client device 202, the client application 224, of the user session or application session. In some embodiments, the encrypted access token has a payload including a user identifier that is encrypted as part of the encrypted access token. Such user identifier may include user confidential data, such as personally identifiable information used as a user identifier (e.g., user phone number or e-mail address). For example, the user identifier may comprise a phone number (e.g., an international mobile subscriber identity (IMSI) or a mobile subscription identification number (MSIN)) of the user account, which may also server as the user account number for a mobile telecommunications subscriber. Such a user identifier is secured through encryption as part of the encrypted access token, thereby protecting user confidential data.

Although any type of encrypted token may be used as the encrypted access token, the IDP 204 generates the encrypted access token as a JavaScript Object Notation (JSON) Web Encryption (JWE) token in some embodiments. A JWE token comprises five portions: a JWE header, a JWE encrypted key, a JWE initialization vector, a JWE ciphertext (i.e., an encrypted payload corresponding to a plaintext payload containing the user identifier), and a JWE authentication tag. Each of these five portions may be encoded using Base64 or Base64 for URL encoding (or other binary-to-text encoding schemes) to obtain the string of characters that represents the JWE token. Generating a JWE token comprises multiple steps, some of which may be performed in various orders. The process of generating the JWE begins with randomly generating a content encryption key for use in encrypting the plaintext payload. The JWE encrypted key may then be generated by encrypting the content encryption key with a public key and text-encoding the resulting encrypted key (e.g., using Base64URL encoding). Likewise, an initialization vector may be randomly generated and text-encoded to produce the JWE initialization vector. The JWE header may next be generated by generating and text-encoding a header containing parameters regarding the JWE token, such as encryption algorithm identifiers or certificate indicators. The indicated algorithm and parameters may then be used to generate the JWE ciphertext by encrypting the plaintext payload containing the user identifier (and any additional data in the payload) using the content encryption key and the initialization vector previously generated, then text-encoding the resulting encrypted payload. An authentication tag may be generated to ensure the integrity of the token and text-encoded to obtain the JWE authentication tag. The JWE token may then be generated by assembling these five portions into a compact string, which portions may be separated by periods. Once generated by the IDP 204, the encrypted access token is sent to and received by the client application 224 of the client device 202 via the network 208.

At block 406, the client application 224 stores the received encrypted access token in the memory 212 of the client device 202 (e.g., as the encrypted access token 226) for further use. When the encrypted access token is bound to a session (e.g., a user session or application session), it may be stored for use during the session or until earlier expired. In some embodiments, the encrypted access token is further secured during storage by failing to provide the client device 202 with a key to decrypt the token. Thus, the payload of the encrypted access token (including any user confidential data) is secured while stored in the memory 212 of the client device 202 because the client device 202 lacks a key to decrypt the payload of the encrypted access token. In further embodiments, the encrypted access token may be refreshed periodically by automatically obtaining a new encrypted access token prior to expiration of the previous encrypted access token. In this manner, the encrypted access token may be further secured without imposing an additional burden on the user of frequently providing the user account credentials.

At block 408, in some embodiments, the client application 224 generates a proof-of-possession (PoP) token for use in requesting secure resources from a resource server 206. The PoP token may be generated to include one or more indications of parameters or requests to a resource server 206 (e.g., as a query, array, string, XML file, or JSON object providing parameters in a format accepted by a target API or service 272 of a target resource server 206). The PoP token may be bound to the client application 224, an application session, or a user session, and the PoP token may be signed by a private key associated with the client application 274 or a user account. The PoP token may be generated by the client application 224 to include the parameters for the resource request, as well as headers and other items in a format expected by the target API or sever 272 to which the resource request message will be sent. Thus, the PoP token may be a hash of a message including headers, an identifier of the target API or service 272 (e.g., a URL corresponding to the address of the API or service), and resource request parameters, which hashed message may then be signed by the client application 224 (e.g., using a private key) to prevent modification or reuse by an intercepting third party.

At block 410, the client application 224 generates a resource request message to send to the resource server 206. The resource request message includes the encrypted access token and an indication of the resource requested or the action requested from the resource server 206. The encrypted access token 226 may be accessed from the memory 212 of the client device 202. Indications of requested resources or actions may be explicit (e.g., specifically identified in the resource request message) or implicit (e.g., at least partially indicated by the API or service 272 to which the resource request message is addressed). In some embodiments, the PoP token may be used to provide the indication of one or more requested resources or actions, such as through a payload that includes such indication (e.g., a string, query, or other data parameters accepted by the API or service 272 of the resource server 206 to specify resources or actions). Thus, the resource request message may include both an encrypted access token to indicate the client application 224 had permission (through an authenticated or authorized user account) to access the resource and a PoP token to indicate the resource or action requested (or parameters associated with such request).

At block 412, the client application 224 sends the resource request message to an API or server 272 of the resource server 206 via the network 208. The resource request message may be sent via a secure communication protocol (e.g., using TLS), but encryption of the encrypted access token and PoP token may be used to provide stronger security. Upon receiving the resource request message, the resource server 206 may verify user account access permissions using the encrypted access token, then parse the resource request to perform a corresponding action (e.g., providing content, processing data, or generating and sending a response). In some embodiments, verifying access may include decrypting the payload of the encrypted access token at the resource server 206. In further embodiments, the resource server 206 may communicate with the IDP 204 via the network 208 to authorize the resource request by sending the encrypted access token to the IDP 204 for validation. In some embodiments, the resource server 206 may further verify a user account indicated by a user identifier in the encrypted access token is authorized to access the resource requested, which may be determined based upon both the user identifier and an indication of the resource or action requested by the resource request message (either as part of a PoP token or otherwise explicitly or implicitly indicated by the resource request message). Upon determining the resource request is valid (i.e., the client application 224 is authorized to access the requested resource), the resource server 206 performs the resource request. In some embodiments, performing the resource request includes sending a resource response to the client application 224 of the client application via the network 208.

At block 414, in some embodiments, the client application 224 receives a resource request response from the resource server 206 based upon the resource request message. The resource request response may include content from the resource server 206 or may simply confirm receipt and performance of the resource request indicated in the resource request message. Upon receiving a response, the client application 224 may present an indication of the response to the user of the client device 202.

At block 416, the client application 224 determines whether there is another resource request to send to the same or a different resource server 206. The client application 224 may wait for another resource request until the encrypted access token is no longer valid, such as by reaching an expiration time or termination of a bound session. When a new resource request is identified, the client application proceeds to generate and send a resource request message corresponding to the new resource request, according to blocks 408-414 above, then determines whether there is a further resource request when returning to block 416. When no further resource requests are identified or available (e.g., upon expiration or revocation of the encrypted access token), the secure resource access method 400 ends.

Although individual operations of one or more methods are illustrated and described as separate operations, one or more of the individual operations may be performed concurrently, and nothing requires that the operations be performed in the order illustrated. Structures and components presented as separate components in example configurations may be implemented as a combined structure or component. Similarly, structures and components presented as a single component may be implemented as separate components. These and other variations, modifications, additions, and improvements fall within the scope of the subject matter herein.

To the extent that any term recited in the claims at the end of this disclosure is referred to in this disclosure in a manner consistent with a single meaning, that is done for the sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based upon the application of 35 U.S.C. § 112(f).

What is claimed:

1. A method for securing confidential data used in accessing online resources, comprising:
   authenticating, by communication between a client device and an identity provider (IDP) via a communication network, a user account for use by a client application of the client device based upon user credentials associated with the user account by:
      sending, from a user agent running on the client device, the user credentials to the IDP;
      receiving, at the user agent, an encrypted message containing an authorization code from the IDP; and
      providing, by the user agent, the authorization code to the client application;
   sending, from the client application to the IDP, a token request message including the authorization code to indicate authentication of the user account;
   receiving, at the client application from the IDP, an encrypted access token having a payload including a user identifier that is encrypted as part of the encrypted access token;
   sending, from the client application to a resource server via the communication network, a resource request including the encrypted access token; and
   receiving, at the client application from the resource server, a resource request response based upon the encrypted access token.

2. The method of claim 1, wherein the user identifier included in the encrypted access token comprises a phone number associated with the user account.

3. The method of claim 1, wherein the client device lacks a key to decrypt the payload of the encrypted access token.

4. The method of claim 1, further comprising:
storing, in a memory of the client device, the encrypted access token,
wherein sending the encrypted access token to the resource server includes accessing the encrypted access token from the memory.

5. The method of claim 1, further comprising:
generating, by the client application, a proof-of-possession (PoP) token including an indication of a resource associated with the resource server, which PoP token is signed by a private key of the client application,
wherein sending the resource request includes sending the PoP token to the resource server.

6. The method of claim 1, wherein the encrypted access token is a JavaScript Object Notation (JSON) Web Encryption (JWE) token generated by the IDP.

7. The method of claim 1, wherein the encrypted access token is bound to a user session of the user account in the client application.

8. A computer system for securing confidential data used in accessing online resources, comprising:
one or more processors;
a program memory operatively connected to the one or more processors and storing executable instructions that, when executed by the one or more processors, cause the computer system to:
authenticate a user account for use by a client application of the computer system based upon user credentials associated with the user account by communication between the computer system and an identity provider (IDP) via a communication network by:
sending the user credentials to the IDP from a user agent running on the computer system;
receiving an encrypted message containing an authorization code at the user agent from the IDP; and
providing the authorization code from the user agent to the client application;
send a token request message from the client application to the IDP, the token request message including the authorization code to indicate authentication of the user account;
receive an encrypted access token at the client application from the IDP, the encrypted access token having a payload including a user identifier that is encrypted as part of the encrypted access token;
send a resource request from the client application to a resource server via the communication network, the resource request including the encrypted access token; and
receive a resource request response based upon the encrypted access token at the client application from the resource server.

9. The computer system of claim 8, wherein the computer system lacks a key to decrypt the payload of the encrypted access token.

10. The computer system of claim 8, wherein:
the executable instructions further cause the computer system to generate a proof-of-possession (PoP) token including an indication of a resource associated with the resource server, which PoP token is signed by a private key of the client application; and
the executable instructions that cause the computer system to send the resource request cause the computer system to send the PoP token to the resource server.

11. The computer system of claim 8, wherein the encrypted access token is a JavaScript Object Notation (JSON) Web Encryption (JWE) token generated by the IDP.

12. The computer system of claim 8, wherein the encrypted access token is bound to a user session of the user account in the client application.

13. A tangible, non-transitory computer-readable medium storing executable instructions for securing confidential data used in accessing online resources that, when executed by one or more processors of a computer system, cause the computer system to:
authenticate a user account for use by a client application of the computer system based upon user credentials associated with the user account by communication between the computer system and an identity provider (IDP) via a communication network by:
sending the user credentials to the IDP from a user agent running on the computer system;
receiving an encrypted message containing an authorization code at the user agent from the IDP; and
providing the authorization code from the user agent to the client application;
send a token request message from the client application to the IDP, the token request message including the authorization code to indicate authentication of the user account;
receive an encrypted access token at the client application from the IDP, the encrypted access token having a payload including a user identifier that is encrypted as part of the encrypted access token;
send a resource request from the client application to a resource server via the communication network, the resource request including the encrypted access token; and
receive a resource request response based upon the encrypted access token at the client application from the resource server.

14. The tangible, non-transitory computer-readable medium of claim 13, wherein:
the executable instructions further cause the computer system to store the encrypted access token in a memory of the computer system; and
the executable instructions that cause the computer system to send the encrypted access token to the resource server further cause one or more processors of the computer system to access the encrypted access token from the memory.

15. The tangible, non-transitory computer-readable medium of claim 13, wherein:
the executable instructions further cause the computer system to generate a proof-of-possession (POP) token including an indication of a resource associated with the resource server, which PoP token is signed by a private key of the client application; and
the executable instructions that cause the computer system to send the resource request cause the computer system to send the PoP token to the resource server.

16. The tangible, non-transitory computer-readable medium of claim 12, wherein the encrypted access token is a JavaScript Object Notation (JSON) Web Encryption (JWE) token generated by the IDP.

17. The tangible, non-transitory computer-readable medium of claim 12, wherein the encrypted access token is bound to a user session of the user account in the client application.

\* \* \* \* \*